US011416623B2

(12) United States Patent
Hicks et al.

(10) Patent No.: US 11,416,623 B2
(45) Date of Patent: Aug. 16, 2022

(54) AUTOMATIC PENETRATION TESTING ENABLEMENT OF REGRESSION BUCKETS

(71) Applicant: INTERNATIONAL BUSINESS MACHINES CORPORATION, Armonk, NY (US)

(72) Inventors: Andrew C. M. Hicks, Wappingers Falls, NY (US); Thomas William Conti, Poughkeepsie, NY (US); Bryan Childs, Poughkeepsie, NY (US); Michael Page Kasper, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 396 days.

(21) Appl. No.: 16/527,290

(22) Filed: Jul. 31, 2019

(65) Prior Publication Data
US 2021/0034755 A1   Feb. 4, 2021

(51) Int. Cl.
*G06F 21/57*   (2013.01)
*G06F 11/36*   (2006.01)
*G06F 40/205*   (2020.01)

(52) U.S. Cl.
CPC ........ *G06F 21/577* (2013.01); *G06F 11/3684* (2013.01); *G06F 11/3688* (2013.01); *G06F 40/205* (2020.01); *G06F 2221/033* (2013.01)

(58) Field of Classification Search
CPC .. G06F 21/577; G06F 40/205; G06F 11/3684; G06F 11/3688; G06F 2221/033
See application file for complete search history.

(56) References Cited

U.S. PATENT DOCUMENTS

| | | | |
|---|---|---|---|
| 6,574,737 B1 | 6/2003 | Kingsford | |
| 7,392,545 B1 * | 6/2008 | Weber | G06F 21/577 |
| | | | 705/51 |
| 7,877,780 B2 | 1/2011 | Kolawa | |
| 7,953,674 B2 | 5/2011 | Wu | |

(Continued)

FOREIGN PATENT DOCUMENTS

EP   3100192 B1   10/2018

OTHER PUBLICATIONS

Said et al., "An Integrated Approach Towards a Penetration Testing for Cyberspaces" European Journal of Computer Science and Information Technology, vol. 3, No. 1. Mar. 2015, pp. 108-128.

*Primary Examiner* — Douglas M Slachta
(74) *Attorney, Agent, or Firm* — Cantor Colburn LLP; Teddi Maranzano (57) ABSTRACT

A computer-implemented method for generating penetration tests automatically includes parsing an existing system test case, and identifying a particular program call in the system test case. The particular program call can require a particular data access authorization. The method further includes, in response to the system test case including the particular program call, generating a penetration test using a predetermined attack vector. The method further includes executing the penetration test and detecting an unauthorized access being performed during the penetration test. Further, the method includes responsively, sending a notification that identifies the particular program call.

17 Claims, 4 Drawing Sheets

(56) References Cited

U.S. PATENT DOCUMENTS

| | | | | |
|---|---|---|---|---|
| 7,975,296 B2* | 7/2011 | Apfelbaum | ............ | H04L 63/14 |
| | | | | 726/22 |
| 8,127,359 B2* | 2/2012 | Kelekar | ............... | G06F 21/577 |
| | | | | 709/224 |
| 9,069,967 B2 | 6/2015 | Wysopal | | |
| 9,535,824 B2* | 1/2017 | Tripp | .................. | G06F 11/3684 |
| 10,068,095 B1 | 9/2018 | Segal | | |
| 10,367,846 B2* | 7/2019 | Gorodissky | ......... | H04L 63/1408 |
| 11,012,466 B2* | 5/2021 | Gilmore | ............. | H04L 63/1441 |
| 2009/0083854 A1* | 3/2009 | Bozanich | ............. | G06F 21/577 |
| | | | | 726/23 |
| 2010/0281467 A1* | 11/2010 | Arteaga | ............. | G06F 11/3684 |
| | | | | 717/126 |
| 2013/0312102 A1* | 11/2013 | Brake | ................... | G06F 21/577 |
| | | | | 726/25 |
| 2014/0082737 A1* | 3/2014 | Beskrovny | ......... | H04L 63/1433 |
| | | | | 726/25 |
| 2014/0109228 A1* | 4/2014 | Kalman | ............... | G06F 21/577 |
| | | | | 726/25 |
| 2015/0040229 A1* | 2/2015 | Chan | .................... | G06F 21/577 |
| | | | | 726/25 |
| 2016/0080401 A1* | 3/2016 | Zhou | ....................... | H04L 67/02 |
| | | | | 726/1 |
| 2016/0232080 A1* | 8/2016 | Bhattacharya | ...... | G06F 11/3688 |
| 2017/0091460 A1* | 3/2017 | Kuhr | ..................... | G06F 21/577 |
| 2017/0223043 A1* | 8/2017 | Munoz | .................... | H04L 63/20 |
| 2017/0270303 A1* | 9/2017 | Roichman | ........... | G06F 11/3668 |
| 2018/0004948 A1* | 1/2018 | Martin | .................. | G06F 21/552 |
| 2018/0219901 A1* | 8/2018 | Gorodissky | ......... | H04L 63/1433 |
| 2019/0325144 A1* | 10/2019 | Doukhvalov | ....... | G06F 11/3664 |
| 2020/0265144 A1* | 8/2020 | Gwilliams | ........... | G06F 11/3692 |
| 2020/0336507 A1* | 10/2020 | Lee | ......................... | G06F 21/53 |

* cited by examiner

AUTOMATIC PENETRATION TESTING ENABLEMENT OF REGRESSION BUCKETS

BACKGROUND

The present invention generally relates to computer system security and specifically to generating penetration tests automatically to check the vulnerability of a computer program.

Information and/or data security is a critical aspect of a computer system, especially with cloud computing platforms becoming prevalent. Recently, various security breaches have occurred and reported in which sensitive data has been either inadvertently disclosed or stolen. While some of these breaches were caused by human error, insecure computer programs and/or applications have also been identified as the cause in various instances. Accordingly, various techniques are used for testing computer programs to identify and fix security vulnerabilities, but no one methodology is failsafe. Further, such security-analysis techniques require significant time and resources to administer.

SUMMARY

According to one or more embodiments of the present invention, a computer-implemented method for generating penetration tests automatically includes parsing an existing system test case and identifying a particular program call in the system test case. The particular program call can require a particular data access authorization. The method further includes, in response to the system test case including the particular program call, generating a penetration test using a predetermined attack vector. The method further includes executing the penetration test and detecting an unauthorized access being performed during the penetration test. Further, the method includes responsively, sending a notification that identifies the particular program call.

According to one or more embodiments of the present invention, a system includes a memory, and a processor communicatively coupled with the memory, the processor configured to perform a method for generating penetration tests automatically. The method includes parsing an existing system test case, and identifying a particular program call in the system test case. The particular program call can require a particular data access authorization. The method further includes, in response to the system test case including the particular program call, generating a penetration test using a predetermined attack vector. The method further includes executing the penetration test and detecting an unauthorized access being performed during the penetration test. Further, the method includes responsively, sending a notification that identifies the particular program call.

According to one or more embodiments of the present invention, a computer program product comprising a computer-readable memory that has computer-executable instructions stored thereupon, the computer-executable instructions when executed by a processor cause the processor to perform a method. The method includes parsing an existing system test case, and identifying a particular program call in the system test case. The particular program call can require a particular data access authorization. The method further includes, in response to the system test case including the particular program call, generating a penetration test using a predetermined attack vector. The method further includes executing the penetration test and detecting an unauthorized access being performed during the penetration test. Further, the method includes responsively, sending a notification that identifies the particular program call.

The above-described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
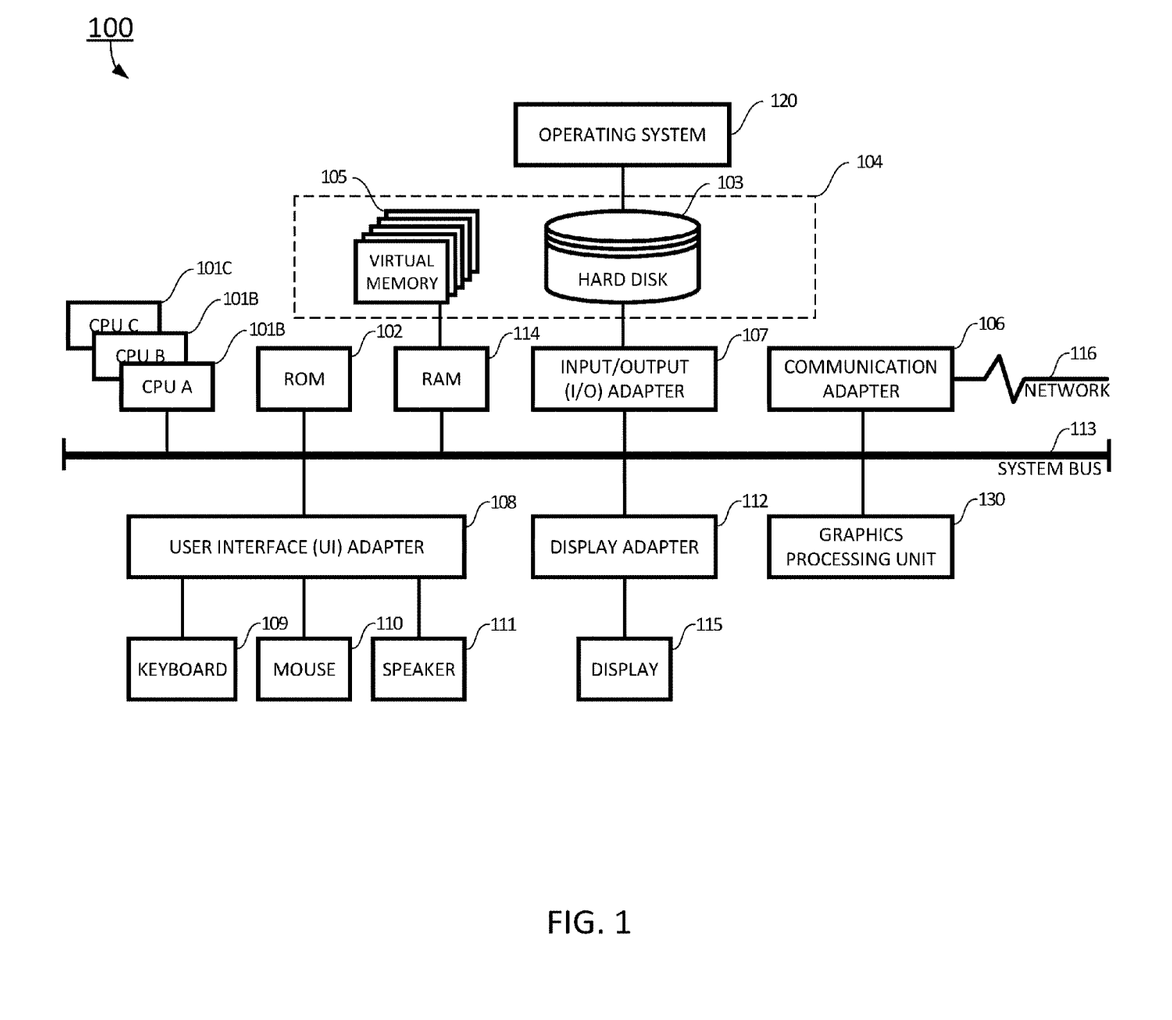
FIG. 1 depicts a computer system for testing security of a computer program according to one or more embodiments of the present invention.

Referring to FIG. 1, a computer system 100 for testing the security of a computer program according to one or more embodiments of the present invention is shown. The computer system 100 has one or more central processing units (processors) 101A, 101B, 101C, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read-only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or virtual storage 105 or any other similar component. Virtual storage 105 is generally understood within computer and information technology industry to combine physical RAM with auxiliary storages. Collectively this virtual storage can make the computer system appear to have more RAM than it actually does, providing greater scalability characteristics, and also adding security-relevant properties such as storage protection keys. I/O adapter 107, hard disk 103, and tape storage device 105 are collectively referred to herein as mass storage 104.

Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where the processing of large blocks of data is done in parallel.

As configured in FIG. 1, the computer system 100 includes processing capability in the form of processors 101, storage capability including system memory 114 and mass storage 104, input means such as keyboard 109 and mouse 110, and output capability including speaker 111 and display 115. In one or more embodiments of the present invention, a portion of system memory 114 and mass storage 104 collectively store an operating system to coordinate the functions of the various components shown in FIG. 1. The network 116 can include symmetric multiprocessing (SMP) bus, a Peripheral Component Interconnect (PCI) bus, local area network (LAN), wide area network (WAN), telecommunication network, wireless communication network, and the Internet.

In one or more embodiments of the present invention, the hard disk 103 is used to store data. In other embodiments, the data is stored in virtual memory 105. Data can be stored in a mass storage facility near a mainframe computer system and may be accessed through the network 116 as shown in FIG. 1. The computer system 100 can be any type of computing devices, such as a mainframe computer, a desktop computer, or any other computing device.

The computer system 100 can be vulnerable to data security risks caused by one or more computer programs executed on the computer system 100. For example, the operating system, one or more system services, one or more software applications, device drivers, or any such computer programs executed by a user on the computer system 100 can lead to a data security risk because of one or more vulnerabilities exposed by the computer program.

An exemplary vulnerability of the computer system 100, which may be protected by using storage protection keys as a defense, may include an unauthorized user passing bad addresses to a system service. The system service could be running with an authorized key, and if it trusts the user-supplied address, the service could indirectly provide that user read or even write access to storage to which that user should not have access. Another vulnerability may be buffer overflows. When parameter areas include variable-length fields, transfers of data can overflow when the boundaries of those length fields are not checked. Yet another exemplary vulnerability is system-owned control blocks. When an unauthorized user passes an address to a system-owned control block, the system service has to verify that block through an independently anchored chain. Otherwise, an unauthorized user can spoof the control block in order to cause that system service to take various actions that it would otherwise not take. Another exemplary vulnerability is causing the system to execute unintended code with elevated privileges, for example by passing the address of a routine in a parameter or in a buffer overflow and causing the system to give control to the program at that address in an authorized state.

There are several existing testing and assessment techniques for validating the functionality of computer programs. However, a technical challenge exists for ensuring that the deployment of the computer program does not expose an enterprise that is operating and/or using the computer program to risks in data security. It should be noted that data security is not limited only to data associated with the computer program itself. A security vulnerability with the computer program can expose any data that is accessible via a computer system executing the computer program.

Existing solutions to address this technical challenge include static analysis (automated code review), dynamic analysis (automated penetration testing), and manual analyses such as code review, design review, and manual penetration testing. Such analysis techniques are aimed at finding security weaknesses and vulnerabilities in the computer program and the results are reported to relevant personnel, such as programmers, product managers, quality assurance (QA) staff, etc. The report can provide detailed results (e.g., program names, line numbers, variable names, data connections, etc.) as well as a summary of the results. The report may be provided in an electronic format, such as a document (e.g. a text file) or as a structured data (e.g. extended markup language (XML) file).

A penetration test is a simulated cyberattack on the computer system, performed to evaluate the security of the computer system. in one or more examples, the penetration test is performed to identify both vulnerabilities, including the potential for unauthorized parties to gain access to the computer system's features and data, as well as strengths, enabling a full risk assessment to be completed. Accordingly, a penetration test can help determine whether a system is vulnerable to attack if the defenses were sufficient, and which defenses (if any) the test defeated.

Typically, penetration analyses documented in the literature to date have used some variant of the Flaw Hypothesis Methodology (FHM). In FHM, "flaw hypothesis" for a system are generated in a mostly ad-hoc manner and then confirmed by scenarios of actual system tests generated by the penetration analyst. Therefore, an assessment of a system's penetration resistance has to rely on the special skills of the penetration analyst in the context of that system.

One or more embodiments of the present invention address such technical challenges by facilitating automatically converting an existing set of regression tests to a penetration testing enabled set of tests. For example, in one or more embodiments of the present invention, natural language processing tools (e.g. natural language tool kit (NLTK)) is used to iterate over an existing test case to identify critical program calls. For example, the test case can directly reference a service number, or perhaps an identifying name for the service where the underlying service number can be understood in a supporting table for identification. It is understood that in other examples, other heuristic solutions can be implemented using any language available, such as a programming language. Using NLTK to parse test cases is just one possible approach to parsing the test case. Further, a monitor is initiated to determine when such a program call is issued. An automatic discovery tool is signaled for altering parameters to the program call based on a predetermined attacking vector. Further, in one or more embodiments of the present invention, a target protected storage location, such as in memory, or a register is isolated and a protection execution attack is triggered upon request through altering the existing set of regression tests. Subsequently, an authorized service that drives the functionality is initiated, and it is verified that the authorized service uses the target storage location that was selected.

Accordingly, one or more embodiments of the present invention facilitate making use of existing test cases in regression buckets to automatically generate penetration tests. Without the features provided by one or more embodiments of the present invention, due to the modernization of penetration testing tools, there was a need to create new penetration tests to verify the older code with new attack vectors that were missed or that arose due to timing windows and the modernization of computer technology.

Figure 2:
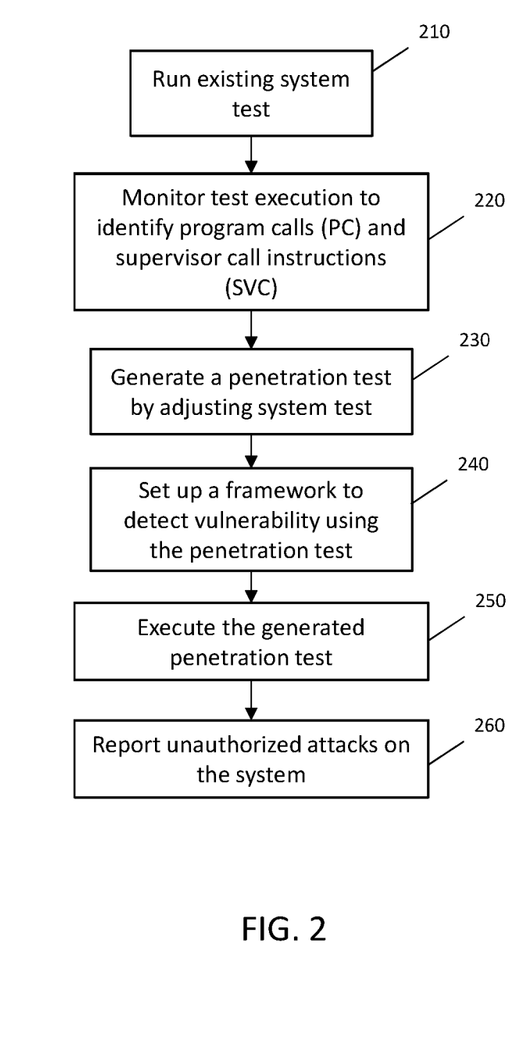
FIG. 2 depicts a flowchart for a method to automatically generate penetration tests and testing security of a computer system according to one or more embodiments of the present invention.

FIG. 2 depicts a flowchart for a method to automatically generate penetration tests and testing security of a computer system according to one or more embodiments of the present invention. The method includes running an existing system test, at block 210. The system test is a test that is used to test the functionality of the computer program. The system test can be one from a set of multiple system tests that are developed for the computer program. All the system tests can be used to generate respective penetration tests. Alternatively, or in addition, only some selected system tests are used to generate corresponding penetration tests. For example, only those system tests that include a particular program call (PC) or a supervisor call instruction (SVC) are used to generate penetration tests.

In this regard, in one or more embodiments of the present invention, the execution of the system test is monitored to identify if a predetermined PC or SVC is invoked by the system test, at block 220. The PC and/or SVC can be one from a predetermined list of PCs and/or SVCs. Monitoring the PC and/or SVC can include monitoring for a particular system signal from a specific list of system signals, for example, an interrupt, an abort, illegal instruction, erroneous arithmetic instruction, or any other such system-level signals. Alternatively, or in addition, the monitoring can include monitoring for a specific opcode in the machine language that is being executed. The monitoring can further include monitoring for particular function calls being made.

Further, the method includes generating a penetration test by adjusting the system test and setting up a framework to detect the vulnerability, at block 230. For example, the PC/SVC in the system test is adjusted according to an entry in a predetermined attack vector. Here, generating a penetration test by adjusting the system test can include adding lines of code for penetration testing into the system test itself. Accordingly, when the system test is executed next time, penetration testing is also performed. Alternatively, or in addition, generating the penetration test includes generating code, dynamically, and automatically, in the form of a new test, where the lines of code in the newly generated test when executed perform the penetration test.

Figure 3:
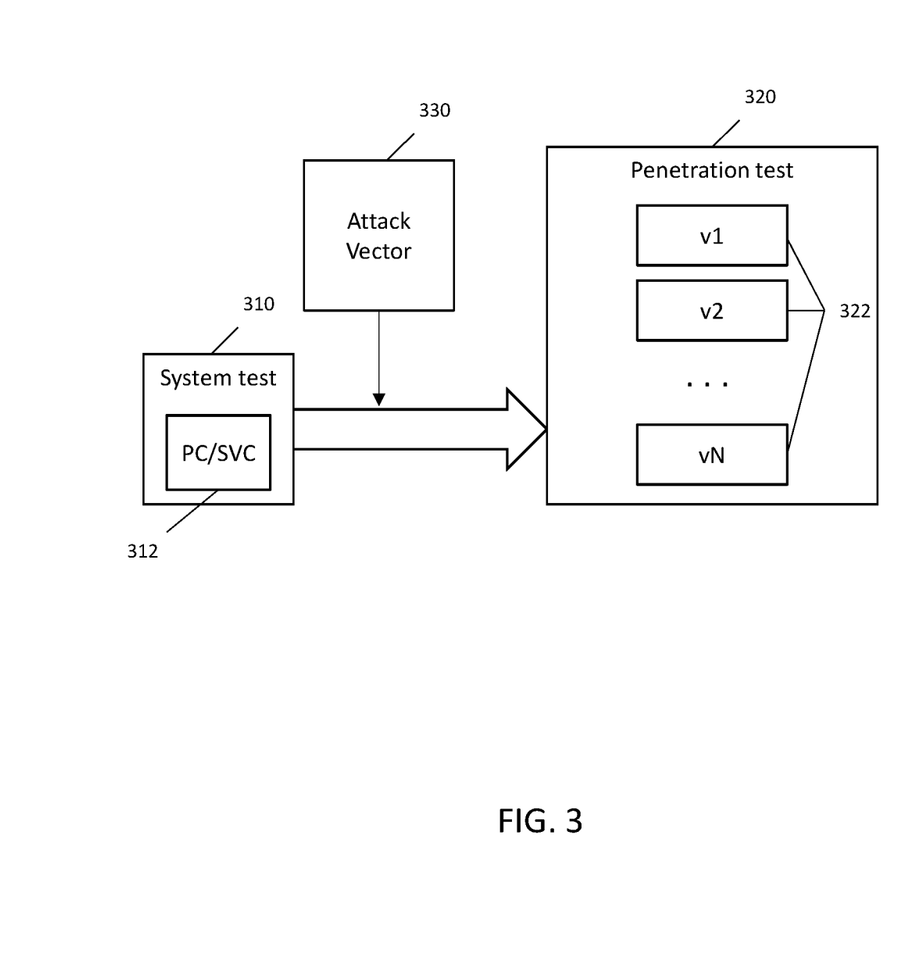
FIG. 3 depicts a block diagram to visualize a generation of a penetration test from an existing system test according to one or more embodiments of the present invention.

FIG. 3 depicts a block diagram to visualize a generation of a penetration test from an existing system test according to one or more embodiments of the present invention. Here, the system test 310 includes a PC/SVC 312. It should be noted that in other examples, the system test 310 can include multiple PCs/SVCs. The penetration test 320 includes multiple versions (v1, v2, . . . , vN) 322 of the system test 310. Each version 322 of the penetration test includes all of the instructions from the system test 310, except the PC/SVC 312 is adjusted. The adjustment is made according to an entry in a predetermined attach vector 330. The attack vector 330 includes one or more types of security breach attempts. For example, the attack vector 330 can include buffer overflows, fetch or store protection bypasses, or privilege escalation through malicious code execution in an authorized state. Accordingly, a first version 322 of the penetration test can include the PC/SVC 312 using a first element from the attack vector 330, a second version 322 includes PC/SVC 312 using a second element from the attack vector 330, and so on. In one or more examples, the attack vector 320 is associated with the particular PC/SVC 312 that is identified. Accordingly, each type of PC/SVC 312 can have a different attack vector that tests different types of unauthorized accesses.

Referring back to the flowchart in FIG. 2, the method further includes setting up a framework to detect a vulnerability based on the penetration test 320 that is generated, at block 240. For example, based on the attack vector 330, a specific result is identified that, if achieved (or not achieved) by the execution of the penetration test 320, represents that the computer program has a security vulnerability. The new instructions that are added to generate the penetration test 320 are generally known to fail and cause an exception from a system functionality standpoint so as to try and access unauthorized portions of the computer system 100 on which the computer program is being executed.

For example, if the first version 322 is a memory overflow type attack, a framework that is set up checks if the memory overflow attack was successful after the execution of the first version 322 of the penetration test. Other types of checks are setup for corresponding types of attacks from the attack vector 330. Alternatively, or in addition, if the execution of the penetration test 320 results in use of a system key that is not supposed to be accessible to the computer program, a vulnerability has been detected. various other types of access attacks are tested in this manner.

The method further includes executing the penetration test 320, at block 250. The execution includes executing every version 322 that is created. The execution can be performed using the same testing framework that is used to execute the system test in one or more embodiments of the present invention. The execution of the penetration tests, in one or more embodiments of the present invention, is performed by enabling a particular bit in the testing framework being used for performing system tests. For example, the particular bit enables penetration testing when executing the system tests. Accordingly, if the particular bit is enabled (e.g. =1) only then the penetration tests are executed when the test framework is used for testing the computer program/computer system. if the particular bit is disabled (e.g. =0), the penetration tests are not executed, only the system tests are executed. In one or more examples, the particular bit is added to the testing framework when the penetration tests are generated.

During the execution of the penetration tests, all the unauthorized system accesses are noted and these are reported to a user, at block 260. The reporting can be performed as an electronic message, such as an email, a text message, an instant message, and the like. Alternatively, or in addition, the notification can be performed via a user interface, such as an audio notification, a visual notification, or a combination thereof.

Figure 4:
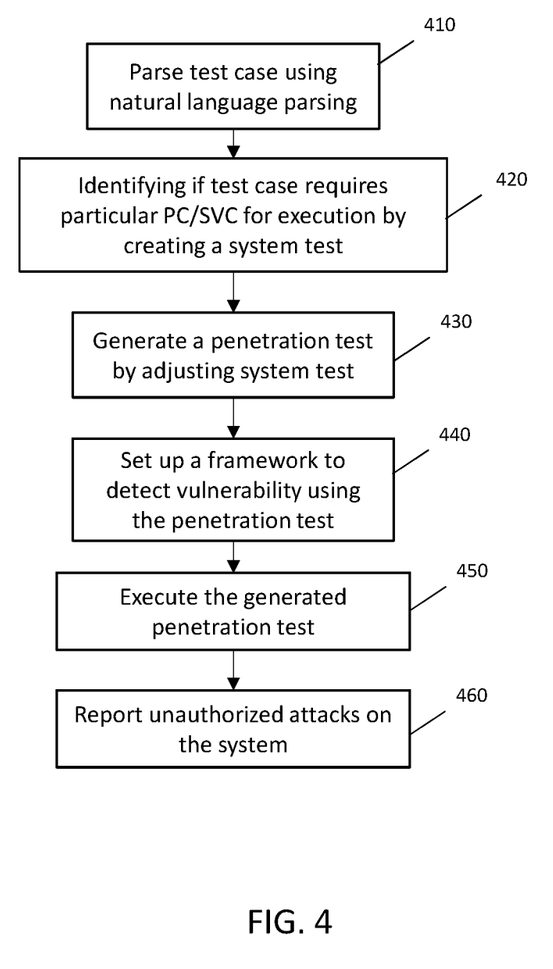
FIG. 4 depicts a flowchart of another method for automatically generating penetration tests for a computer program according to one or more embodiments of the present invention.

FIG. 4 depicts a flowchart of another method for automatically generating penetration tests for a computer program according to one or more embodiments of the present invention. In this case, compared to the method discussed with reference to FIG. 2, the method generates the penetration tests from test cases that are in natural language, rather than having system test code available. Here, the method includes parsing the test cases using a natural language parsing toolkit, at block 410. This can be performed using existing natural language parsing libraries via corresponding application program interfaces.

The method further includes identifying particular PCs/SVCs that are required for executing a test corresponding to the test case, at block 420. Determining if a PC/SVC would be required includes automatically generating the system test 310, that is the program instructions for the system test 310 corresponding to the test case. Further, the generated system test 310 is checked to determine if the generated program instructions include the particular PC/SVC 312. If the program instructions include the PC/SVC 312, a penetration test 320 is generated from the generated system test 310, at block 430. This is performed as described earlier with reference to FIG. 3 and is not repeated here.

Further, the method includes setting up a framework to detect vulnerability using the penetration test 320, at block 440. The generated penetration test 320 is executed, at block 450. Any unauthorized accesses performed during execution of the generated penetration test 320 are reported to the user, at block 460.

Accordingly, one or more embodiments of the present invention facilitate generating penetration test automatically for a computer program and/or for a computer system. The automatic generation of the penetration test can be initiated using existing system tests for a computer program (or system) and/or from tests cases provided in natural language. Such automatic generation of the penetration tests not only improves the efficiency of the computer security checking by requiring fewer resources (manpower, time) but also facilitates creating new penetration tests automatically as new penetration testing tools and/or attack vectors are available.

For example, a user can create a first set of penetration tests from an existing test (or test case) at time point 1 using a first attack vector. At time point 2, when a second attack vector is created, that identifies additional types of possible attacks, the user can create a second set of penetration tests from the same existing test (or test case) using the second attack vector.

In this manner, embodiments of the present invention provide a practical application of generating penetration tests by automatically generating computer code/instructions and further identifying the signals to be monitored to detect unauthorized access i.e. security breach. Embodiments of the present invention are rooted in computer technology, particular computer data security, and automatic computer code generation.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source-code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for generating penetration tests automatically, the computer-implemented method comprising:
   parsing an existing system test case for a system;
   identifying a particular program call in the system test case, the particular program call requiring a particular data access authorization;
   in response to the system test case including the particular program call, converting the system test case into a penetration test case, wherein the converting comprises:
      creating a new test case that comprises all computer-executable instructions from the existing system test case;
      adjusting the particular program call for the penetration test case by adding computer-executable instructions to the new test case, wherein the computer-executable instructions test one or more types of unauthorized accesses listed in a predetermined attack vector;
   testing the system, which comprises:
      executing the system test case; and
      in response to determining that the penetration test case is to be performed based on a first value of a flag:
         executing the new test case that performs a penetration test and detecting an unauthorized access being performed during the penetration test; and
         responsively, sending a notification that identifies the particular program call and the unauthorized access that was detected when executing the system new test case.

2. The computer-implemented method of claim 1, wherein parsing the system test case comprises performing natural language parsing or parsing the system test case that is in a programming language.

3. The computer-implemented method of claim 1, wherein generating the penetration test case comprises generating a penetration test case for each of the one or more types of unauthorized accesses listed in the predetermined attack vector.

4. The computer-implemented method of claim 1, wherein the predetermined attack vector lists the one or more types of unauthorized accesses that are specifically associated with the particular program call in the system test case.

5. The computer-implemented method of claim 1, wherein detecting the unauthorized access comprises monitoring for a specific signal and checking contents of a particular storage location based on the execution of the computer-executable instructions added to the system test case.

6. The computer-implemented method of claim 1, wherein creating the new test case comprises crating a plurality of new test cases respectively corresponding to each unauthorized access listed in the predetermined attack vector.

7. The computer-implemented method of claim 1, wherein the flag is a bit that is set/reset in a testing framework being used to test the system.

8. A system comprising:
   a memory; and
   a processor communicatively coupled with the memory, the processor configured to perform a method for generating penetration tests automatically, the method comprising:
      parsing an existing system test case for a system under test;
      identifying a particular program call in the system test case, the particular program call requiring a particular data access authorization;
   in response to the system test case including the particular program call, converting the system test case into a penetration test case, wherein the converting comprises:
      creating a new test case that comprises all computer-executable instructions from the existing system test case;
      adjusting the particular program call for the penetration test case by adding computer-executable instructions to the new test case, wherein the computer-executable instructions test one or more types of unauthorized accesses listed in a predetermined attack vector;
   testing the system under test, which comprises:
      executing the system test case; and
      in response to determining that the penetration test case is to be performed based on a value of a flag:
         executing the new test case that performs a penetration test and detecting an unauthorized access being performed during the penetration test; and
      responsively, sending a notification that identifies the particular program call and the unauthorized access that was detected when executing the system new test case.

9. The system of claim 8, wherein parsing the system test case comprises performing natural language parsing or parsing the system test case that is in a programming language.

10. The system of claim 8, wherein generating the penetration test comprises generating a penetration test case for each of the one or more types of unauthorized accesses listed in the predetermined attack vector.

11. The system of claim 8, wherein the predetermined attack vector lists the one or more types of unauthorized accesses that are specifically associated with the particular program call in the system test case.

12. The system of claim 8, wherein detecting unauthorized access comprises monitoring for a specific signal and checking contents of a particular storage location based on the execution of the computer-executable instructions added to the system test case.

13. The system of claim 8, wherein creating the new test case comprises crating a plurality of new test cases respectively corresponding to each unauthorized access listed in the predetermined attack vector.

14. A computer program product comprising a computer-readable memory that has computer-executable instructions stored thereupon, the computer-executable instructions when executed by a processor cause the processor to perform a method comprising:
   parsing an existing system test case for a system;
      identifying a particular program call in the system test case, the particular program call requiring a particular data access authorization;
      in response to the system test case including the particular program call, converting the system test case into a penetration test case, wherein the converting comprises:

creating a new test case that comprises all computer-executable instructions from the existing system test case;

adjusting the particular program call for the penetration test case by adding computer-executable instructions to the new test case, wherein the computer-executable instructions test one or more types of unauthorized accesses listed in a predetermined attack vector;

testing the system, which comprises:
  executing the system test case; and
  in response to determining that the penetration test case is to be performed based on a first value of a flag:
    executing the new test case that performs a penetration test and detecting an unauthorized access being performed during the penetration test; and
    responsively, sending a notification that identifies the particular program call and the unauthorized access that was detected when executing the new test case.

15. The computer program product of claim 14, wherein parsing the system test case comprises performing natural language parsing or parsing the system test case that is in a programming language.

16. The computer program product of claim 14, wherein generating the penetration test comprises generating a penetration test case for each of the one or more types of unauthorized accesses listed in the predetermined attack vector.

17. The computer program product of claim 14, wherein the predetermined attack vector lists the one or more types of unauthorized accesses that are specifically associated with the particular program call in the system test case.

* * * * *